H. I. LAHR.
CAR SEAL.
APPLICATION FILED MAY 21, 1908.
923,861.
Patented June 8, 1909.
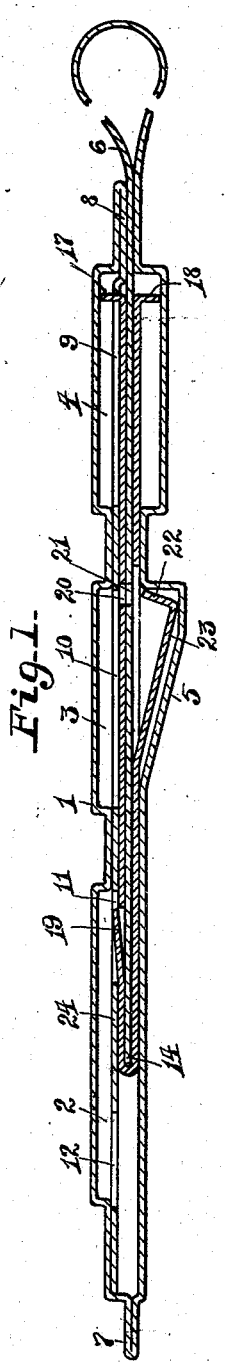
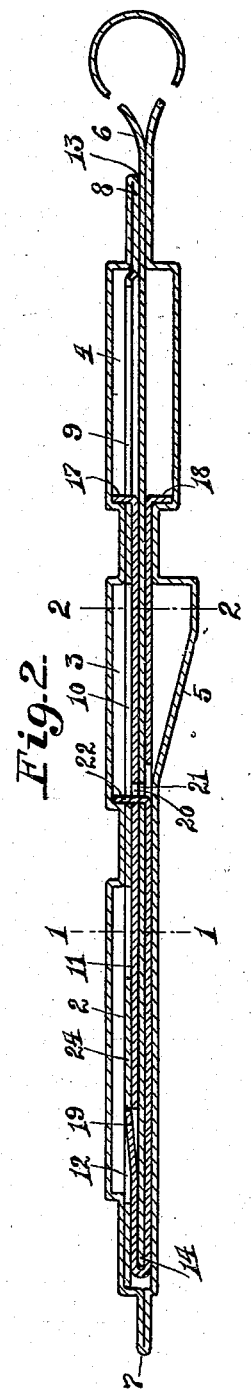
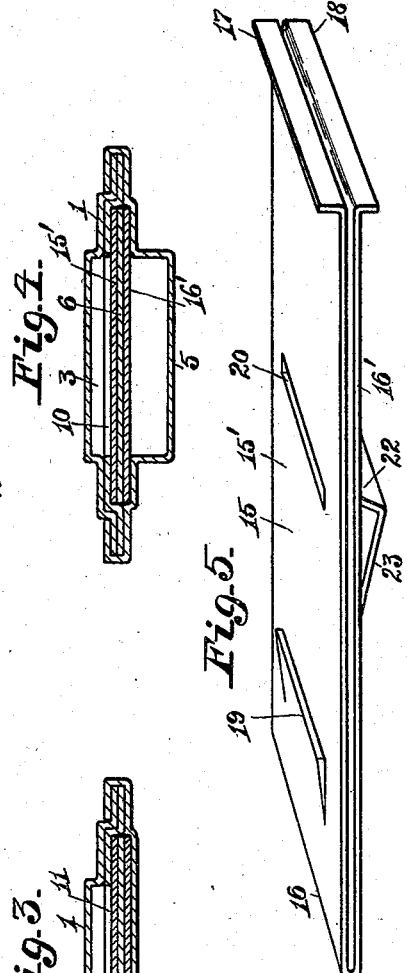
Witnesses
George Oltsch
G. M. Cole
Harry I. Lahr.
Inventor
By
Att'y.

UNITED STATES PATENT OFFICE.

HARRY I. LAHR, OF SOUTH BEND, INDIANA.

CAR-SEAL.

No. 923,861.  Specification of Letters Patent.  Patented June 8, 1909.

Application filed May 21, 1908. Serial No. 434,116.

*To all whom it may concern:*

Be it known that I, HARRY I. LAHR, a citizen of the United States, residing at South Bend, in the county of St. Joseph and State of Indiana, have invented certain new and useful Improvements in Car-Seals, of which the following is a specification.

This invention relates to car seals.

The seal is adapted particularly for fastening the doors of freight cars, but it may be used for sealing other cars, packages, baggages, or the like, and has for one of its objects to provide a seal embodying such characteristics that the door or package with which the seal is associated cannot be opened without destroying the seal itself.

It is common in the art to provide automatic catch seals which consist of tongues or springs in or on the casing member which, when the strap is inserted, spring into holes or recesses in the strap; or vice versa, or both casing and strap contain tongues which by virtue of the spring in the tongue interlock with one another. It is common to provide seals with a movable locking member, such as a spring, some part or all of this spring locking member being held in tension for release to cause a sealing of the lock. In the present invention there are no such tongues or springs held in tension between the sliding member and the casing, and there are no interlocking springs which are liable to derangement.

It is therefore another object of the present invention to provide a seal whose parts are not liable to derangement and which is so constructed that all avenues or openings for the insertion of instruments cannot be inserted for the purpose of unlocking the seal without completely destroying the same.

A still further object of the invention is to provide a seal embodying such characteristics that it can be made in multiple by the use of gang dies and other devices working in gang or multiple, thereby lessening the cost of manufacture, the invention in the present instance consisting of two parts, that is the casing and strap in one part and the slidable locking device in another part.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details, without departing from the spirit or sacrificing any of the advantages of the invention.

In the drawings:—Figure 1 is a longitudinal sectional view of the invention prior to the sealing of the same, the tongue being positioned to move the slidable locking member into locking position. Fig. 2 is a similar view illustrating the device sealed. Fig. 3 is a transverse sectional view on the line 1—1 of Fig. 2. Fig. 4 is a transverse sectional view on the line 2—2 of Fig. 2. Fig. 5 is a detail perspective view of the slidable locking member.

Referring now more particularly to the accompanying drawings, the reference character 1 indicates a casing having three transverse chambers 2, 3, and 4, the intermediate chamber 3 having one side inclined, as indicated at 5, for a purpose presently explained.

The strap 6 and the casing 1 are formed of a single piece of material, the material being bent intermediate its ends, as indicated at 7, and has one end continued to form the aforesaid strap 6 with its opposite end bent back upon itself, as indicated at 8, the backwardly turned part 8 forming a partition and being provided with the slots 9, 10, 11 and 12, for a purpose presently explained, and the casing at the part where the strap 6 is continued therefrom and the part 8 bent back upon the body of the casing forming the throat 13 through which passes the free end 14 of the strap 6 when it is desired to seal the lock.

Slidably mounted within the casing 1 is a locking member 15 consisting preferably of a single piece of material bent back upon itself at 16 to provide spaced upper and lower portions 15' and 16', the free ends of the upper and lower parts 15' and 16' of the slidable locking member being bent to provide shoulders 17 and 18, respectively, both shoulders 17 and 18 sliding in the chamber 4 with the upper shoulder 17 projecting through the slot 9 of the partition 8. The upper part 15' of the slidable locking member 15 is also provided with a transverse slit to permit of a bulging or raising of the metal or the material of which the locking member is formed to provide a hump 19, it being understood that what appears to be slits at the ends of the before mentioned slit and at right angles to the latter are not in reality slits, but the sides or ends of the hump 19. In other words, this hump 19 is not in the form of a spring, but is pressed or otherwise forced from the body 15' of the slidable locking member, the upper portion 15' also having a transverse slot 20 intermediate its ends adapted to aline with the slot 21 in the strap 6, said registering slots 20 and 21 being adapted to receive the upwardly turned end 22 of the tongue 23 struck up or otherwise formed on or from the lower member 16' of the slidable locking member.

Before the seal is locked, the tongue 23 hangs therefrom with its lip 22 out of the registering slots 20 and 21, resting normally within and at the bottom of the intermediate chamber 3, as clearly shown in Fig. 1. When the tongue 23 is in this position, the slidable locking member is forwardly of the casing with the shoulders 17 and 18 of the slidable locking member near the throat 13 of the casing, as also shown in Fig. 1.

To seal the lock, the free end 14 of the band or strap 6 is passed through the throat 13 of the casing and into engagement with the bight portion 16 of the slidable locking member 15. The slidable locking member 15 is then forced toward the opposite end of the casing by manipulation of the strap or band 6. By thus forcing the locking member to the opposite end of the casing, the inclined side 5 of the intermediate chamber 3 will cause the tongue 23 to be forced upwardly and throw its lip 22 into and through the alining slots 20 and 21 resulting in a fastening of the strap or band to prevent withdrawal of the latter. As the tongue 23 is forced into the operative position just described, the hump 19 of the locking member passes under the bridge part 24 of the partition member 8, causing said bridge part 24 to spring away from the hump until the hump reaches the slot 12 of the partition member 8 when the bridge part 24 will retract to its normal position to prevent the slidable locking member from being pulled forwardly of the casing, the forward edge of the hump 19, of course, projecting against the corresponding edge of the slot 12, as clearly shown in Fig. 2.

When the strap or band 6 and the locking member 15 have been disposed in the position shown in Fig. 2, that is, in locking position, the lip 22 of the tongue 23 will positively prevent the surreptitious insertion of an instrument not shown, into and between the partitions 8 and the casing, or between said partition and the strap or band at the point between the chambers 2 and 3, the shoulders 17 and 18 of the locking member 15 preventing the surreptitious insertion of an instrument (not shown) between the casing and the partition member or between the partition member and the hand at the point between the chambers 3 and 4, all as clearly shown in Fig. 2.

From the foregoing it will be seen that I provide a simple device capable of sealing doors, packages, or the like against opening without a positive breaking of the seal or without injuring the latter in such a way as to indicate that the same has been tampered with by an unauthorized person.

What is claimed is:—

1. A seal of the character described comprising a chambered casing having a partition provided with a series of slots, a slidable locking member composed of a single piece of material bent back upon itself to provide spaced members, the free ends of the spaced members being formed to provide shoulders for engagement with one end of one of the chambers of the casing when the seal is locked, one of the members of the slidable locking member having a hump and a transverse slot and the other member having a yieldable tongue provided with a lip, said hump adapted to engage one side of one of the slots of said partition member when the seal is locked, and a band whose free end is adapted to engage the slidable locking member to force the latter to locking position, the band having a slot and one of the chambers of the casing having an inclined portion for engagement by said tongue to force the lip of the latter automatically through the slots of the band and the slot of the slidable locking member to prevent withdrawal of the band.

2. A seal of the character described comprising a casing having a series of chambers, one of the chambers having an inclined portion, the casing also having a slotted partition member extending through all of the chambers, a slidable locking member provided with a hump, a slot and also having a yieldable tongue provided with a lip, and a band adapted to engage the slidable locking member to move the latter into locking position and present its hump adjacent one edge of the slot of the partition member to prevent movement of the locking member from its locked position, said band having a slot adapted to register with the slot of the locking member, said slots of the band and locking member receiving the lip of said tongue when the locking member is forced through the chamber having the inclined portion to lock the band against withdrawal.

3. A seal of the character described comprising a chambered casing having a partition provided with a series of slots, a slidable locking member composed of a single piece of material bent back upon itself to provide spaced members, the free ends of the spaced members being formed to provide shoulders for engagement with one end of one of the chambers of the casing when the seal is locked, one of the members of the slidable locking member having a hump and a transverse slot, the other member having a yieldable tongue provided with a lip, and a band adapted to force the slidable member to locking position, said hump of the locking member forcing the material of the partition between two of its slots outwardly as the hump passes from one slot to the next adjacent slot, the hump engaging one side of the latter slot to hold the locking member in its locking position and the material of the partition retracting to its normal position after the hump has passed from one slot to another, the band having a slot to register with the slot of the locking member to receive the lip of said tongue when the locking member is forced to locking position to lock the band against withdrawal from the casing.

4. A seal of the character described comprising a chambered casing, a slidable locking member having projecting elements in each chamber, and a band to force the locking member into locking position, one of the projections of the locking member coöperating with the interior of one of the chambers to hold the locking member against withdrawal and one of the other projections of the locking member coöperating with the band in one of the other chambers to lock the band against withdrawal from its casing, the other projections of the locking member in its third chamber being adapted to engage one end of the latter to reinforce the closed connection between the third chamber and the chamber adjacent thereto.

5. A seal of the character described comprising a chambered casing having a partition provided with spaced slots in one of said chambers, one of the chambers having an inclined part, a slidable locking member having a hump disposed in one of the slots of the partition when the locking member is in unlocked position, said locking member having a slot intermediate its ends and also having a yieldable tongue provided with a lip, and a band adapted to engage the locking member and force it from its unlocked position to locked position, the hump of the locking member in its sliding movement forcing the material of the partition between its slots outwardly away from the hump and springing back into normal position when the hump reaches the next slot to lie in front of the hump and prevent withdrawal of the locking member from its locked position, said tongue riding over said inclined portion of one of the chambers to force its lip through the slots of the band and locking member to lock the band against withdrawal from the casing.

6. A seal of the character described comprising a chambered casing, said casing having a partition, a slidable locking member having a hump for engagement with said partition, and also having a slot and a yieldable tongue provided with a lip, and a band for engagement with the locking member to move the latter into locking position, said band having a slot, and the movement of the locking member to locking position causing the yieldable tongue to throw the lip through the slots of the locking member and the band to lock the latter against withdrawal of the casing.

7. A seal of the character described comprising a casing provided with a plurality of chambers, a slidable locking member mounted within and movable in all of the chambers of the casing, the casing having a partition and one of the chambers having an inclined portion, a band to force the slidable locking member into locking position, and means carried by the locking member for engagement with the partition to hold the slidable locking member in locking position, the locking member having a portion for engagement with said inclined portion of one of the chambers when the locking member is forced to locking position to effect a connection between the locking member and the band to prevent withdrawal of the latter.

8. A seal of the character described comprising a casing having a chamber provided with an inclined portion, a locking member slidably mounted in the casing provided with a slot and a tongue having a lip, a band adapted to force the slidable locking member into locked position, said band having a slot and means arranged within the casing for holding the slidable locking member in locked position, the tongue of the locking member engaging the inclined portion of said chamber when the locking member is forced to locking position to throw its lip through the slots of the locking member and the band to prevent withdrawal of the latter.

In testimony whereof I affix my signature, in presence of two witnesses.

HARRY I. LAHR.

Witnesses:
GEORGE OLTSCH,
G. M. COLE.